United States Patent [19]
Dewhirst et al.

[11] Patent Number: 6,018,962
[45] Date of Patent: Feb. 1, 2000

[54] CENTRIFUGAL COMPRESSOR OIL SUMP DEMISTER APPARATUS

[75] Inventors: Randy E. Dewhirst, Onalaska; Matthew Cambio, Black River Falls; Wayne G. Gorski, Bangor, all of Wis.

[73] Assignee: American Standard Inc., Piscataway, N.J.

[21] Appl. No.: 09/212,831

[22] Filed: Dec. 16, 1998

[51] Int. Cl.[7] ................................................. F25B 43/02
[52] U.S. Cl. ............................................ 62/468; 62/469
[58] Field of Search .......................... 62/468, 469, 470, 62/471, 474, 503; 417/423.1; 415/117; 210/DIG. 5

[56] References Cited

U.S. PATENT DOCUMENTS

| | | | |
|---|---|---|---|
| Re. 29,378 | 8/1977 | Bloom | 55/473 |
| 3,644,054 | 2/1972 | Pilarczyk | 415/179 |
| 3,748,068 | 7/1973 | Pilarczyk | 417/423 |
| 3,809,493 | 5/1974 | Pilarczyk | 415/199 A |
| 3,835,918 | 9/1974 | Pilarczyk | 165/47 |
| 4,050,237 | 9/1977 | Pall et al. | 60/39.08 |
| 4,213,307 | 7/1980 | Watson | 62/192 |
| 4,359,329 | 11/1982 | Willeitner | 55/186 |
| 4,404,812 | 9/1983 | Zinsmeyer | 62/84 |
| 4,788,825 | 12/1988 | Capulca et al. | 62/84 |
| 4,938,664 | 7/1990 | Zinsmeyer | 417/83 |
| 5,214,937 | 6/1993 | Henrichs et al. | 62/468 |
| 5,242,475 | 9/1993 | Stine et al. | 55/319 |
| 5,301,771 | 4/1994 | Sishtla et al. | 184/6.16 |
| 5,404,964 | 4/1995 | Zinsmeyer et al. | 184/6.12 |
| 5,685,699 | 11/1997 | Holmes et al. | 417/423.1 |

*Primary Examiner*—Henry Bennett
*Assistant Examiner*—Marc Norman
*Attorney, Agent, or Firm*—William J. Beres; William O'Driscoll; Peter D. Ferguson

[57] ABSTRACT

A refrigeration apparatus contains an oil sump having an interior portion. A housing is located, at least in part, within the oil sump interior. The housing has at least one inlet and at least one outlet. The inlet allows a vent gas stream to enter the housing and the outlet allows a vent gas stream to exit the housing. The inlet may be an aperture extending circumferentially around the housing about one-third to one-half of the housing's circumference. Additionally, the inlet should be above the surface level of any oil pool in the sump. A coalescing demister filter is located within the housing between the inlet and the outlet. The housing may include a wall for sheltering the filter from agitated areas of the gearbox. The filter is configured to remove substantially all of the oil from the vent gas stream. The filter may also have an outlet end which is sealed from the oil sump. The filter may also be pleated and enhances oil coalescence. The filter may be substantially hollow, having an inner surface and an outer surface. The inner surface may be in communication with the housing outlet and the outer surface may be in communication with the housing inlet. The apparatus may also contain a compressor which has a low pressure area, or suction cover. The outlet communicates with the suction cover interior and the low pressure area. The compressor low pressure area may be downstream of the compressor guide vanes and upstream of the compressor impeller.

40 Claims, 5 Drawing Sheets

CENTRIFUGAL COMPRESSOR OIL SUMP DEMISTER APPARATUS

BACKGROUND OF THE INVENTION

The present invention relates to refrigeration equipment and specifically applies to all chiller applications including water cooled, air cooled and process applications. More particularly, the present invention relates to refrigeration equipment including a coalescing oil sump demister. The present invention is described with respect to centrifugal compressors but is applicable to all compressors having a refrigerant/lubricant mixture.

Compressors are used to compress a refrigerant. In refrigeration equipment, such as centrifugal compressors, refrigerants have an affinity for oil and therefore tend to mix with oil. This mixing has the undesirable effects of reducing the utility of both the oil and the refrigerant. Specifically, oil can be lost to the refrigeration system if oil mist or droplets are carried in the vent gas stream.

Demisting is the process by which oil is separated from a refrigerant-oil vapor mixture. A system for "demisting" oil from the refrigerant-oil mixture is disclosed in, for example, U.S. Pat. No. 4,359,329 to Willeitner. In such a system, cylindrically shaped sleeves with wire mesh arranged therein are used to remove oil from a refrigerant-oil vapor mixture. The oil removed then falls due to gravity. Willeitner does not, however, disclose a housing located within the oil sump, a coalescing filter, or a filter located within the housing. Additionally, in Willeitner, oil passes downstream of the demisters.

A coalescing oil filter is disclosed in U.S. Pat. No. 4,213,307 to Watson. A coalescing filter medium has an upstream side in communication with an inlet and a downstream side in communication with a refrigerant gas outlet and an oil outlet. When the coalescing filter of Watson is used, oil in the bottom of the filter housing passes through an oil outlet. The oil then passes through a line to an oil pump. The oil pump then returns oil through yet another line to the interior of the gear and bearing housing. Watson does not, however, disclose a filter housing located in the oil sump interior or a filter located within such a housing.

U.S. Pat. No. 5,685,699 to Holmes et al. shows a demister 10 which keeps oil mist from the transmission chamber 30 from passing to the impeller. The demister 10 is located high in the transmission chamber 30 above the gears 31, 34 and precedes a vent pipe 65 leading to the suction housing cavity 67. Details of the demister are not provided.

The above-described conventional demisters have the undesirable features of a limited demister filter surface area, the need for a complex system for transporting oil from a demister to an oil sump, and allowing oil to pass through the demister filter, thereby making the demisting process inefficient.

BRIEF SUMMARY OF THE INVENTION

One object of the invention is to provide a more effective apparatus for separating oil from the refrigerant in refrigeration equipment.

Another object of the invention is to provide a demister element with a relatively large surface area that allows the demister element to more effectively separate oil from refrigerant.

An additional object of the invention is to provide a demister element disposed such that substantially only refrigerant, not oil, is downstream of the demister element.

Still another object of the invention is to provide a demister element expected to last the lifetime of the refrigeration apparatus.

Yet another object of the invention is to avoid the need for complex systems for transporting oil from a demister element to the oil sump while maintaining an efficient demister.

Still another object of the invention is to locate a demister element in the least turbulent area of the compressor thereby maximizing its efficiency. By providing a barrier between the gear box and the oil sump and locating the demister element in the oil sump area, the turbulent environment of the gear box is avoided.

A further object of the invention is to minimize the pressure drop across the demister in order to ensure that lubricating oils drain from the low pressure area to the oil pool.

One or more of the preceding objects, or one or more other objects which will become plain upon consideration of the present specification, are satisfied, at least in part, by the invention described herein.

One aspect of the invention is a refrigeration apparatus containing an oil sump which has an interior. A housing is located, at least in part, within the oil sump. The housing has at least one inlet and at least one outlet. An inlet allows a vent gas stream including refrigerant and oil to enter the housing and an outlet allows a vent gas stream including refrigerant to exit the housing. The inlet may be an aperture extending circumferentially around the housing about one-third to one-half of the housing circumference, but may also extend 360° around the housing circumference as long as the demister element ends are suitably supported. Additionally, the inlet should be above the level of any oil pool in the sump. The housing may include a wall for sheltering a demister element within the housing from agitated areas of the sump.

The present invention further provides a method of locating a demister element in a centrifugal compressor. The method comprises the steps of: providing a centrifugal compressor having a gear box area, an oil sump area, and a vapor inlet; providing a barrier between the gear box area and the oil sump area; providing a demister element associated with the oil sump area where the demister element has an inlet and an outlet; operably connecting the demister element inlet to the oil sump area such that oil enriched refrigerant vapor can flow thereto; and providing a vent line from the demister element outlet to the low pressure area to create a flow path from the gear box area and the oil sump area through the demister element to the low pressure area.

DETAILED DESCRIPTION OF THE INVENTION

Figure 1:
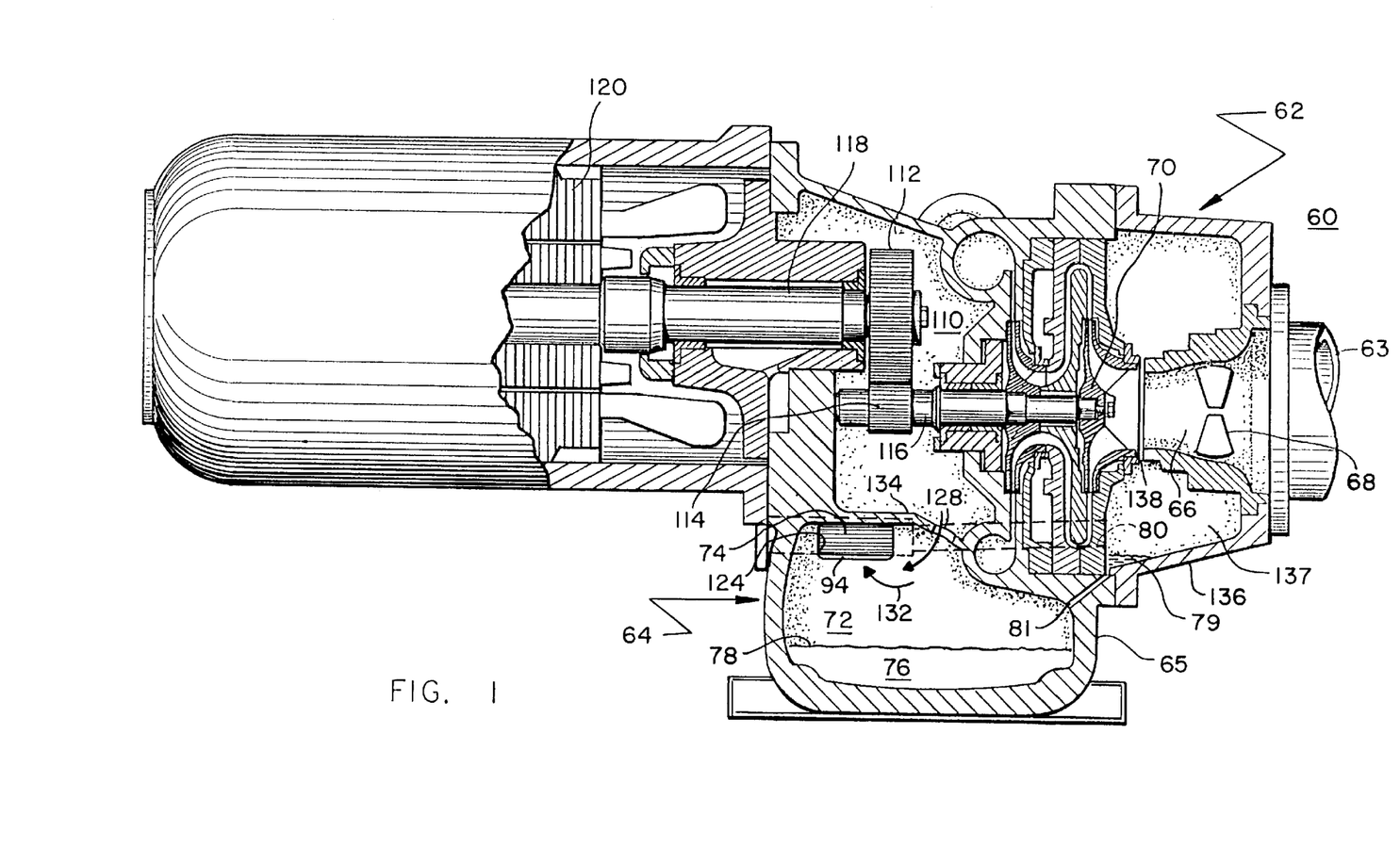
FIG. 1 is an elevation, partially in section, of the compressor and oil sump, schematically showing the present demister element.

FIG. 1 represents a refrigeration apparatus 60—in this instance a centrifugal compressor 62. The compressor 62 includes a refrigerant vapor inlet 63, an oil sump 64, a compressor housing 65, a low pressure area 66, inlet guide vanes 68, and a first stage impeller 70. The oil sump 64 has an interior 72, in which a filter housing 74 is located. In the preferred embodiment, the oil sump 64 contains an oil pool 76 which has a surface level 78. The oil sump 64 is in communication with the compressor 62 via a low pressure vent 80 open to the interior 137 of the suction cover 136 as well as the low pressure area 66. Oil entrained in the refrigerant vapor collects in a pool 79 at the bottom of the suction cover 136. A drain line 81 is provided in the housing 65 to return the oil from the pool 79 to the oil pool 76.

Figure 2:
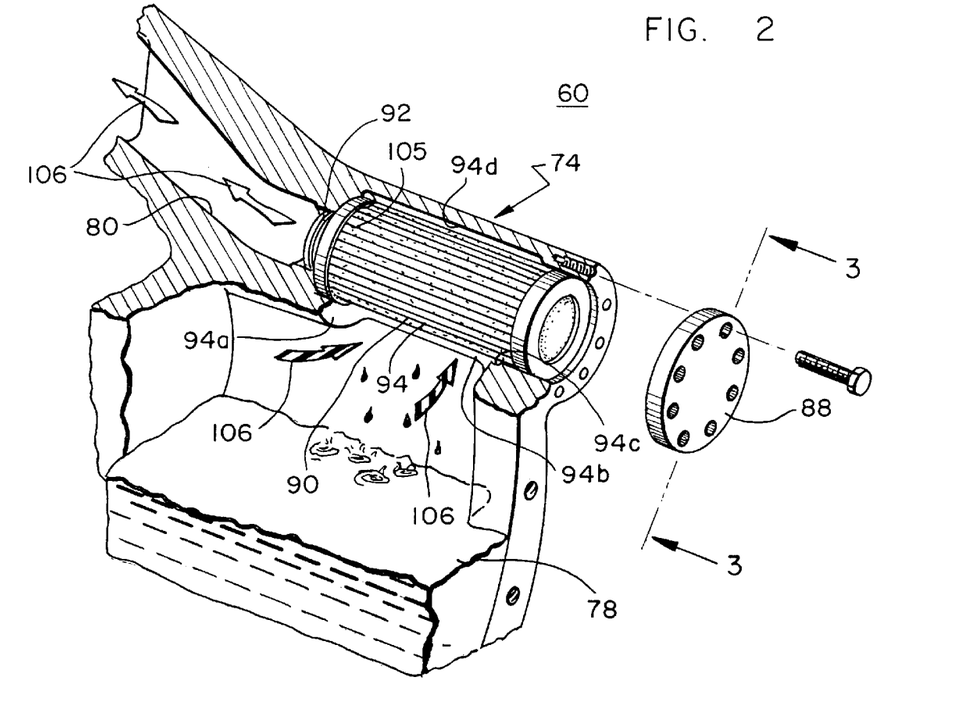
FIG. 2 is a perspective view of a housing and coalescing demister element according to the present invention. The oil sump is shown diagrammatically.
Figure 3:
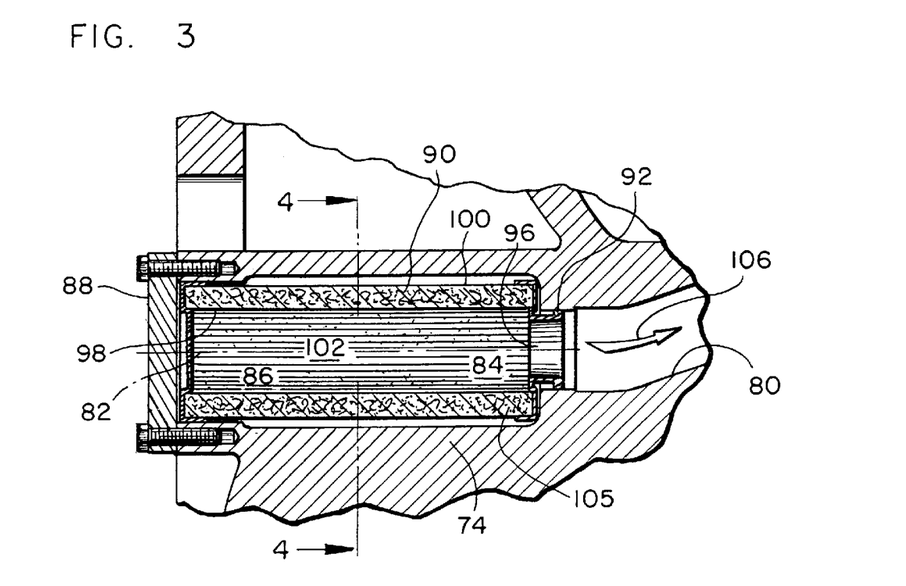
FIG. 3 is a sectional view of the coalescing demister element and housing taken along lines 3—3 of FIG. 2.
Figure 5:
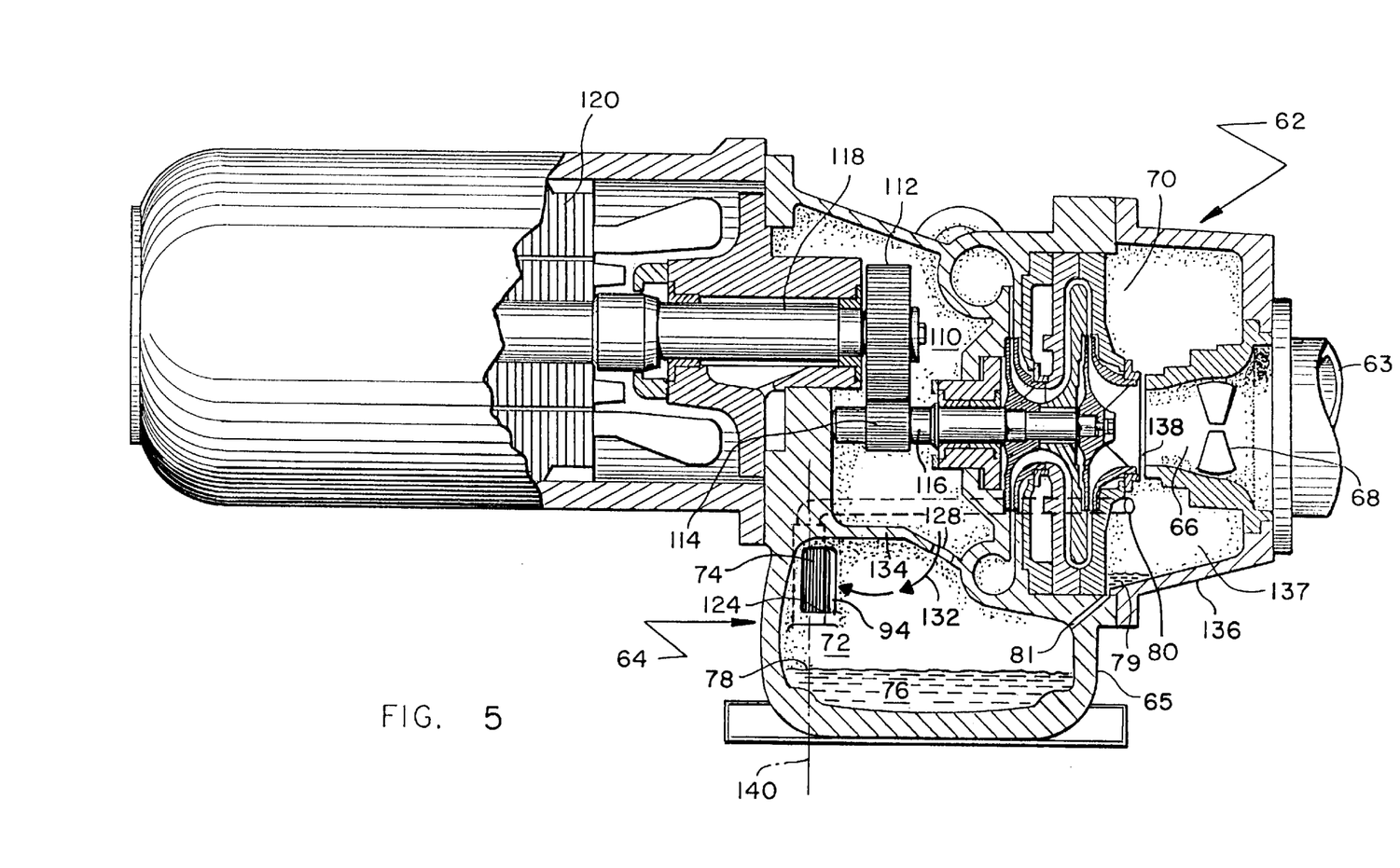
FIG. 5 is an elevation, partially in section, of the compressor and oil sump of FIG. 1, schematically showing an alternative embodiment of the demister element.

Referring to FIGS. 1, 2 and 3, the filter housing 74 is preferably formed or cast as part of the compressor housing 65, is located within the oil sump interior 72, and is incorporated into the oil sump low pressure vent 80. The filter housing 74 may be located entirely inside the oil sump 64 or only partially located within the sump 64. The housing 74 as shown in FIG. 3 is substantially cylindrical in shape and extends along an axis 82. That is, the housing 74 may have a shape like that formed by projecting a base along an axis. The housing 74 may have, for example, a circular, oval, or rectangular shaped cross-section. The housing 74 may also be non-cylindrical or irregular in shape. Additionally, the housing 74 has a hollow inner portion and includes opposing ends—a substantially open end 84 and a substantially closed end 86. A cover 88 is attached to the housing 74 to close the housing 74, forming its substantially closed end 86. The housing 74 supports and encloses a coalescing demister element 90. A sealing device 92 may be placed between the housing 74 and the sump low pressure vent 80 at the substantially open end 84 of the housing 74. The axis 82 is horizontal as shown but can also be vertically aligned as shown in FIG. 5. In fact, drainage off a vertical axis 82 is better.

The housing 74 has an inlet 94, outlined by the faces 94a, 94b, 94c, and 94d, as shown in FIG. 2. Although only one inlet 94 is shown in FIG. 2, more inlets may be incorporated into the housing 74. The inlet 94 does not need to be regular in shape. Additionally, if multiple inlets are present, they need not be uniform in size or shape. The inlet 94 preferably extends circumferentially along about one-half to one-third of the housing circumference but may be extended 360° around the housing circumference as long as the demister element ends are suitably supported. This is shown and discussed with regard to FIG. 6.

Referring to FIG. 3, the housing 74 also has an outlet 96 at its substantially open end 84. The outlet 96 in this embodiment is circular, located at the portion of the housing 74 abutting the sump low pressure vent 80. The outlet 96 need not be circular, however, as it may be one of a wide variety of shapes, including, for example, triangular, rectangular, or irregular shapes.

Additionally, the apparatus 60 may have more than one outlet 96 and/or low pressure vent 80. The outlet 96 is in communication with the low pressure area 66 of the compressor 62 via the sump low pressure vent 80. The housing outlet 96 is located downstream of the coalescing demister element 90 and upstream of the compressor low pressure area 66.

FIG. 3 shows the coalescing demister element 90 located within the housing 74. The demister element 90 and housing 74 are positioned and shaped such that the housing 74 shelters the demister element 90, at least in part, from oil-agitated areas of the sump 64, such as, for example, where the gears operate. The demister element 90 may be composed of, for example, a bonded mat of fibers. The fibers may be synthetic such as, for example, nylon. Alternatively, the fibers may also be metal. The fibers may be elongated cylindrically-shaped fibers and may be woven or stacked and shaped randomly to form a non-woven fabric or screen. Preferably, the demister element 90 includes fibers having a diameter, randomness, and spacing and made of such material that the demister element 90 enhances oil coalescence and is easily permeable to refrigerant vapor. Such filters are commercially available as coalescing filters.

Figure 4:
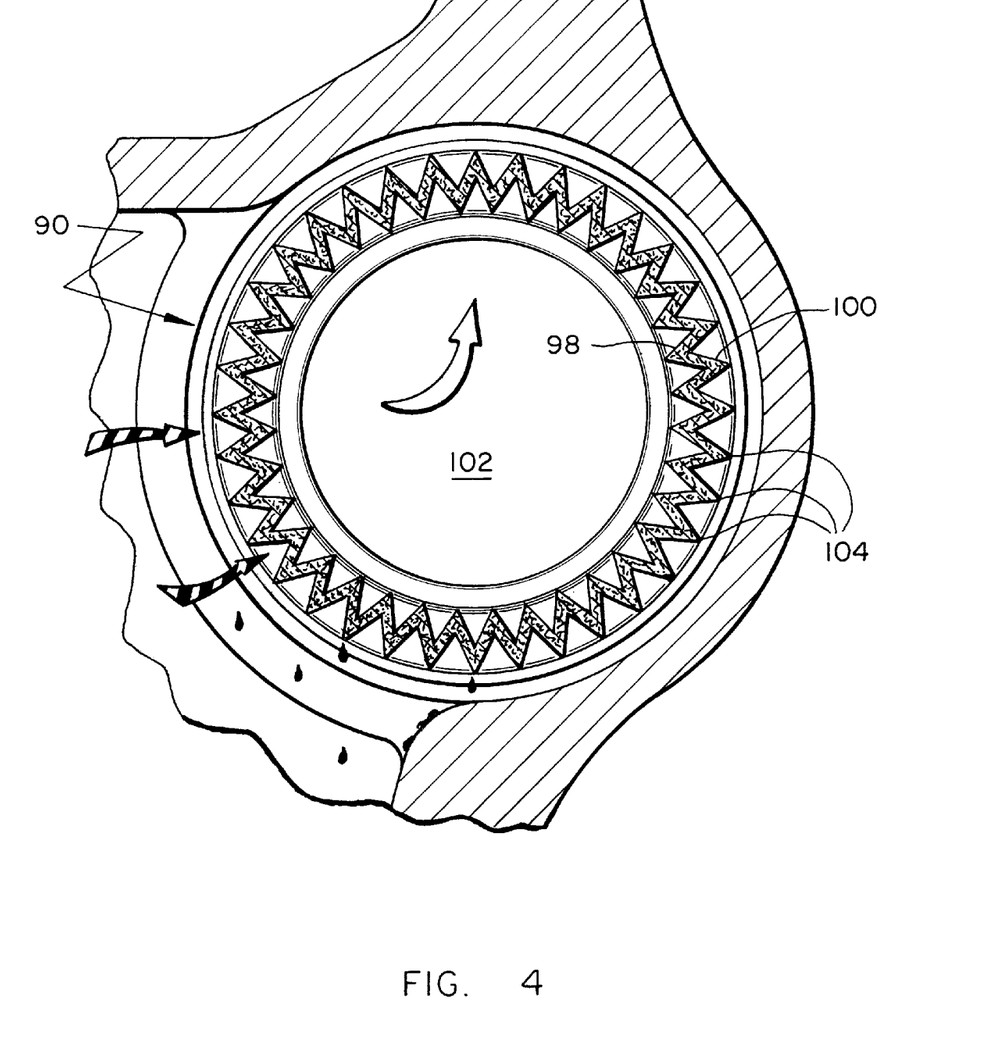
FIG. 4 is a sectional view of the coalescing demister element taken along lines 4—4 of FIG. 3.

In this embodiment, the demister element 90 is substantially cylindrical in shape, extending along the axis 82. The demister element 90 is hollow, having an inner surface 98 and an outer surface 100, defining a central passage 102, as shown in FIG. 3. This cylindrical shape, however, is not necessary to the invention. As with the housing 74, the shape of the demister element 90 may be any type of cylinder or may be irregular. In this embodiment, the demister element 90 contains several pleats 104, as shown in FIG. 4. The pleats 104 create a greater surface area on the outer surface 100 of the demister element 90 than if the demister element 90 had no pleats 104. Pleats 104 are therefore a preferred feature, though not essential.

The demister element 90 has an outlet end 105 positioned near the sump low pressure vent 80. The demister element 90 is located between the inlet 94 and outlet 96 of the housing 74. Additionally, the demister element 90 should be positioned within the housing 74 so that it is above the surface level 78 of an oil pool 76 in the sump 64.

In this embodiment, the demister element 90 and housing 74 are substantially concentric, and both the demister element 90 and housing 74 are substantially cylindrical in shape. The demister element 90 need not, however, be cylindrically shaped or concentric with the housing 74.

Referring particularly to FIG. 2, when the apparatus 60 is in use, a vent gas stream represented by arrows 106 flows within the oil sump interior 72. The vent gas stream 106 contains both oil and refrigerant. The arrangement of the outlet 96, demister element 90, and low pressure vent 80 to the interior 137 and the low pressure area 66 (preferably the lowest pressure area within the compressor 62) draws the vent gas stream 106 through the housing inlet 94 and into the housing 74. Because the outer surface 100 of the demister element 90 is positioned across the inlet 94 of the housing 74, the vent gas stream 106 comes into contact with the outer surface 100.

Refrigerant vapor in the vent gas stream 106 passes through the demister element 90 and into its central passage 102. Because of its oil coalescing nature, however, the demister element 90 prevents at least most and preferably substantially all of the oil from passing through the demister element 90 and into its central passage 102. As a result of this arrangement, substantially only refrigerant, not oil, remains in the vent gas stream 106 downstream of the demister element 90. The oil collects on the outside of the demister element 90 in small drops. As more of the vent gas stream 106 comes into contact with the filter outer surface 100, more small drops of oil form on the outer surface 100. These small drops combine (i.e., coalesce) into larger drops on the outer surface 100 of the demister element 90. When the oil drops become large enough, gravity causes the larger oil drops to drip off the demister element 90, forming or adding to an oil pool 76 in the oil sump 64.

In this embodiment, the demister element 90 allows refrigerant vapor to readily pass into the passage 102 because the demister element 90 is relatively thin. Additionally, the pleated surface provides a greater surface area for refrigerant to pass through the filter and for oil to collect and combine (i.e., coalesce) on the outer surface 100 of the demister element 90.

The inner surface 98 of the demister element 90 is in communication with the outlet 96. This allows refrigerant from the vent gas stream 106, which has come through the demister element 90, to pass from the housing 74, through the housing outlet 96, and to the low pressure area 66 of the compressor 62 via the low pressure vent 80.

A seal is created by the sealing device 92 between the housing 74 and low pressure vent 80. This seal is provided to prevent oil from bypassing the demister element 90 and travelling downstream of the outlet 96. The sealing device may be one of many different types, including, for example, an o-ring.

The filter housing 74 is located in the interior 72 of the oil sump 64. The compressor 62 includes a gear box area 110 in which the drive gear 112 and the pinion gear 114 are located. The pinion gear is mounted on a common shaft 116 with the impeller 70 while the drive gear 112 is on the main drive shaft 118. The compressor 62 can be considered to be aligned with the axis of the main drive shaft 118. The main drive shaft 118 is operably connected to the motor 120. The gear box area 110 is a highly turbulent environment inasmuch as the pinion gear 114 is rotated a more than several thousand RPM. This highly turbulent environment is common to all centrifugal chillers and rotating machines of this nature.

The filter housing 74 is preferably located with its inlet 94 open to the interior 72 of the sump. Since an access aperture 128 between the gear box area 110 and the interior 72 is not line of sight for locations in area 124, the turbulent activity of the gear box area 110 is further avoided. Arrow 132 illustrates the line of sight avoidance created by a barrier 134 as vapor travels from the gear box area 110 to the area 124.

The vent line 80 is either cast in the compressor housing 65 or an external line is provided. The vent line 80 terminates in the interior 137 of the suction cover 136 of the compressor 62. The entire area within the suction cover 136 is at the same pressure as the low pressure area 66 due to a gap 138 which effectively equalizes that pressure.

The filter housing 74 is carefully sized to minimize the pressure drop across the filter housing 74. Pressure drops in the range of 3 to 4 inches of water caused the pool 79 in the suction cover 136 to back up due to the greater pressure in the interior 72 as compared to the suction cover interior 137. It is desirable that the pressure drop be 1 inch or less of water across the filter housing 74 and, preferably on the order of 0.15 inches of water. With the desirable and preferred pressure drop, the difference in pressure between the suction cover interior 137 and the gear box interior 72 is not significant, thus allowing the lubricant to drain from the pool 79 through the drain line 81 into the oil pool 76.

FIG. 5 is an alternative embodiment of the invention of FIG. 1 where like reference numerals are used for like elements. In FIG. 5, the housing 74 and the coalescing filter element 90 are vertically oriented with a vertical axis 140. Oil which collects and combines on the outer surface 100 of the demister element 90 drains more easily from the vertical alignment. Unlike the embodiment in FIG. 1 where the axis 82 is aligned with the motor axis of the compressor 62, the axis 140 of FIG. 5 is perpendicular to the axis of the compressor.

Figure 6:
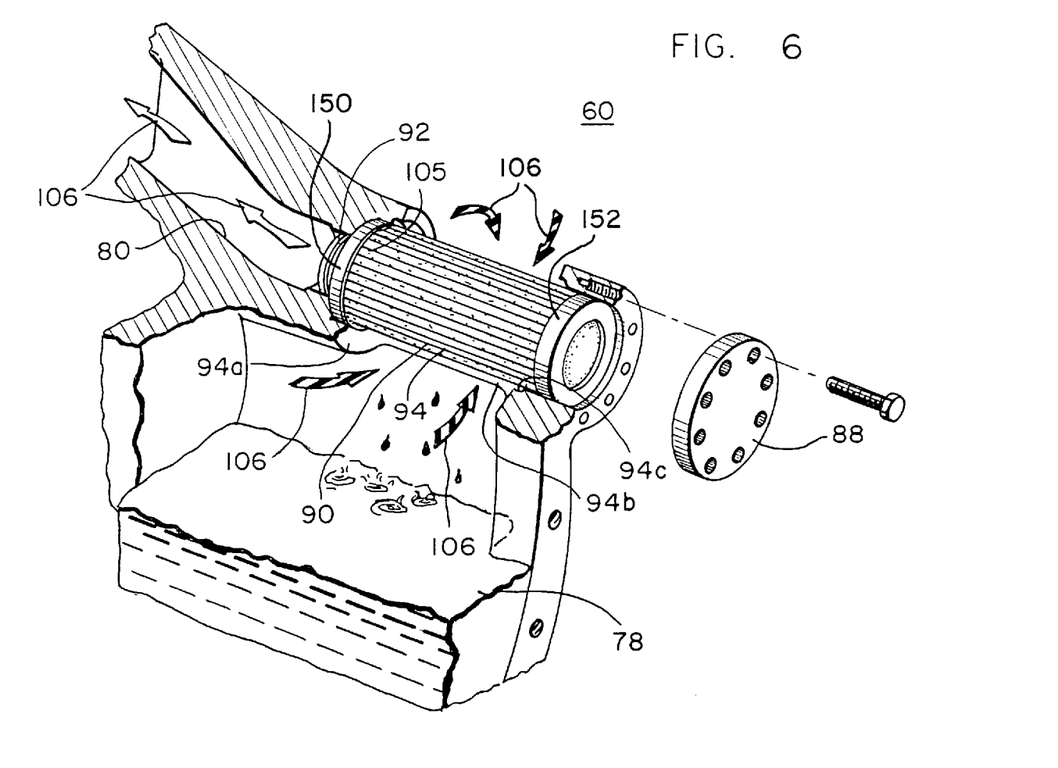
FIG. 6 is an alternative embodiment of the coalescing demister element shown in FIG. 2.

FIG. 6 is an alternative embodiment of the housing and coalescing demister element shown in FIG. 2 where like reference numerals are used for like elements. In the embodiment of FIG. 6, the inlet 94 extends 360° around the housing circumference such that the gas stream 106 encounters the entire outer surface 100. As long as the coalescing element 90 is supported at each of its ends in the housing as indicated by coalescing outlet end 150 and coalescing element distal end 152, the arrangement of FIG. 6 is suitable for use. Potentially, the element 90 could be rigidly supported by a single end such as end 150, preferably by axially elongating that end 150.

While the invention is described in connection with one or more embodiments, it will be understood that the invention is not limited to those embodiments. On the contrary, the invention includes all alternatives, modifications, and equivalents as may be included within the spirit and scope of the appended claims.

What is claimed is:

1. A refrigeration apparatus comprising:
   an oil sump having an interior;
   a housing located at least in part inside the interior of said oil sump, said housing having at least one inlet for allowing a vent gas stream comprising a refrigerant and oil to enter said housing and at least one outlet for allowing a vent gas stream comprising a refrigerant to leave said housing; and
   a coalescing demister element disposed within said housing between said at least one inlet and said at least one outlet.

2. The refrigeration apparatus of claim 1 wherein said at least one inlet is above the level of an oil pool in said sump.

3. The refrigeration apparatus of claim 1 further comprising a compressor having a low pressure area communicating with said outlet.

4. The refrigeration apparatus of claim 3 wherein said compressor further comprises at least one guide vane and a first stage impeller defining said low pressure area and wherein said low pressure area is downstream of said at least one guide vane and upstream of said impeller.

5. The refrigeration apparatus of claim 3 wherein the demister element is sized to minimize pressure drop across the element.

6. The refrigeration apparatus of claim 3 wherein the demister element is sized to have less than 1 inch of water pressure drop across the demister element.

7. The refrigeration apparatus of claim 6 wherein said at least one outlet is located downstream of said element and upstream of said low pressure area.

8. The refrigeration apparatus of claim 1 wherein said element is substantially cylindrical and extends along an axis.

9. The refrigeration apparatus of claim 8 wherein said housing is substantially cylindrical and extends along a second axis which substantially coincides with the first axis.

10. The refrigeration apparatus of claim 9 wherein said housing is substantially cylindrical and extends along a second axis substantially perpendicular to the first axis.

11. The refrigeration apparatus of claim 1 wherein said element comprises an outlet end and said outlet end is sealed from the oil sump.

12. The refrigeration apparatus of claim 1 wherein said element is pleated.

13. The refrigeration apparatus of claim 1 wherein said element is substantially hollow and further comprises an inner surface and an outer surface.

14. The refrigeration apparatus of claim 13 wherein said outer surface is in communication with said at least one inlet and said inner surface is in communication with said at least one outlet.

15. The refrigeration apparatus of claim 1 wherein:

said housing is substantially cylindrical in shape; and said housing has an axial direction, a circumferential direction, and a circumference.

16. The refrigeration apparatus of claim 15 wherein said at least one inlet comprises an aperture extending circumferentially about one-third to one-half of said circumference.

17. The refrigeration apparatus of claim 15 wherein said at least one inlet comprises an aperture extending circumferentially 360° of around said element.

18. The refrigeration apparatus of claim 1 wherein said housing further comprises first and second axial ends, said first axial end is substantially open, said second axial end is substantially closed, and said outlet is disposed at said first axial end.

19. The refrigeration apparatus of claim 1 wherein said housing is defined at least in part by a wall positioned for sheltering said element from agitated areas of the sump.

20. The refrigeration apparatus of claim 1 further comprising a sealing device in contact with said housing for preventing oil from travelling downstream of said at least one outlet.

21. The refrigeration apparatus of claim 1 wherein said element enhances oil coalescence.

22. The refrigeration apparatus of claim 1 wherein said element is configured to remove oil from the vent gas stream comprising a refrigerant and oil.

23. The refrigeration apparatus of claim 22 wherein said element is configured to remove substantially all of the oil from the vent gas stream comprising a refrigerant and oil.

24. A centrifugal compressor comprising:

a refrigerant vapor inlet;

a housing;

a low pressure area within the housing and open to the vapor inlet;

a gear box area within the housing and having a highly turbulent environment;

an oil sump area within the housing;

a barrier between the gear box area and the oil sump area and an aperture therebetween;

a demister element associated with the oil sump area and having an opening between the demister element and the oil sump area; and a vent between the demister element and the low pressure area.

25. The centrifugal compressor of claim 24 wherein the centrifugal compressor has a first axis and wherein the demister element has a second axis substantially aligned with the first axis.

26. The centrifugal compressor of claim 24 wherein the compressor has a first axis and where the demister element has a second axis substantially perpendicular to the first axis.

27. The centrifugal compressor of claim 24 wherein the opening extends circumferentially about one-third to one-half of a circumference of the demister element.

28. The centrifugal compressor of claim 24 wherein the opening extends circumferentially 360° about the circumference of the demister element.

29. The centrifugal compressor of claim 24 wherein the demister element is sized to minimize the pressure differential between the oil sump area and the low pressure area.

30. The centrifugal compressor of claim 29 wherein the demister element is sized to create less than 1 inch of water pressure drop across the demister element.

31. The centrifugal compressor of claim 29 wherein the demister is sized to generate approximately 0.15 inch of water pressure drop across the demister element.

32. A method of locating an demister element in a centrifugal compressor comprising the steps of:

providing a centrifugal compressor having a gear box area, an oil sump area, and a vapor inlet;

providing a barrier between the gear box area and the oil sump area;

providing an demister element associated with the oil sump area where the demister element has an inlet and an outlet;

operably connecting the demister element inlet to the oil sump area such that oil enriched refrigerant vapor can flow thereto; and providing a vent line from the demister element outlet to the low pressure area to create a flow path from the gear box area and the oil sump area through the demister element to the low pressure area.

33. The method of claim 32 wherein the demister element providing step includes a further step of aligning the demister element vertically.

34. The method of claim 32 wherein the demister element providing step includes a further step of aligning the demister element horizontally.

35. The method of claim 32 wherein the demister element inlet is open between one-third and one-half of the circumference of the demister element.

36. The method of claim 32 wherein the demister element inlet is open 360° about the demister element.

37. The method of claim 32 wherein the demister element is sized to minimize the pressure drop across the demister element.

38. The method of claim 32 wherein the demister element is sized to minimize the pressure differential between the oil sump area and the low pressure area.

39. The method of claim 38 wherein the demister element is sized to generate less than 1 inch of water pressure drop across the demister element.

40. The method of claim 39 wherein the demister element is sized to generate 0.15 inches of water pressure drop across the demister element.

* * * * *

UNITED STATES PATENT AND TRADEMARK OFFICE
CERTIFICATE OF CORRECTION

PATENT NO. : 6,018,962

DATED : February 1, 2000

INVENTOR(S) : Randy E. Dewhirst, Matthew Cambio and Wayne G. Gorski

It is certified that error appears in the above-identified patent and that said Letters Patent is hereby corrected as shown below:

Column 2, line 36, insert the follwoing:

--The coalescing demister element is located within the housing between the inlet and the outlet. The demister element may be configured to remove substantially all of the oil from the vent gas stream including refrigerant and oil. The demister element may also have an outlet end which is sealed from the oil sump by a sealing device in contact with the housing. The demister element may also be pleated and include mesh sized to enhance oil coalescence. The demister element may be substantially hollow, having an inner surface and an outer surface. If the demister element is hollow, its inner surface may be in communication with the housing outlet and its outer surface may be in communication with the housing inlet. Such a demister element is commercially available as a coalescing filter element.

The apparatus may also contain a compressor which has a low pressure area, or suction cover. The housing outlet may be in communication with the low pressure area. The low pressure area can be downstream of the compressor inlet guide vanes and upstream of the compressor impeller.

Accordingly, the present invention may also provide a centrifugal compressor. The centrifugal compressor comprises a refrigerant vapor inlet; a housing; a low pressure

UNITED STATES PATENT AND TRADEMARK OFFICE
CERTIFICATE OF CORRECTION

PATENT NO. : 6,018,962
DATED : February 1, 2000
INVENTOR(S) : Randy E. Dewhirst, Matthew Cambio and Wayne G. Gorski It is certified that error appears in the above-identified patent and that said Letters Patent is hereby corrected as shown below:

area within the housing and open to the vapor inlet, and a gear box area within the housing and having a highly turbulent environment. The compressor also comprises an oil sump area within the housing; a barrier between the gear box area and the oil sump area and an aperture therebetween; a demister element associated with the oil sump area and having an opening between the demister element and the oil sump area; and a vent between the demister element and the low pressure area.--

Signed and Sealed this

Sixth Day of February, 2001

Attest:

Q. TODD DICKINSON

*Attesting Officer*  *Director of Patents and Trademarks*